March 23, 1965   C. STÄGER   3,175,172
LOW REFLECTION ENERGY ABSORBERS FOR WAVEGUIDES
Filed Aug. 8, 1962   7 Sheets-Sheet 1

INVENTOR
CHRISTIAN STAGER
BY Toulmin & Toulmin
ATTORNEYS

March 23, 1965 C. STÄGER 3,175,172
LOW REFLECTION ENERGY ABSORBERS FOR WAVEGUIDES
Filed Aug. 8, 1962 7 Sheets-Sheet 2

INVENTOR
CHRISTIAN STAGER
BY Toulmin & Toulmin
ATTORNEYS

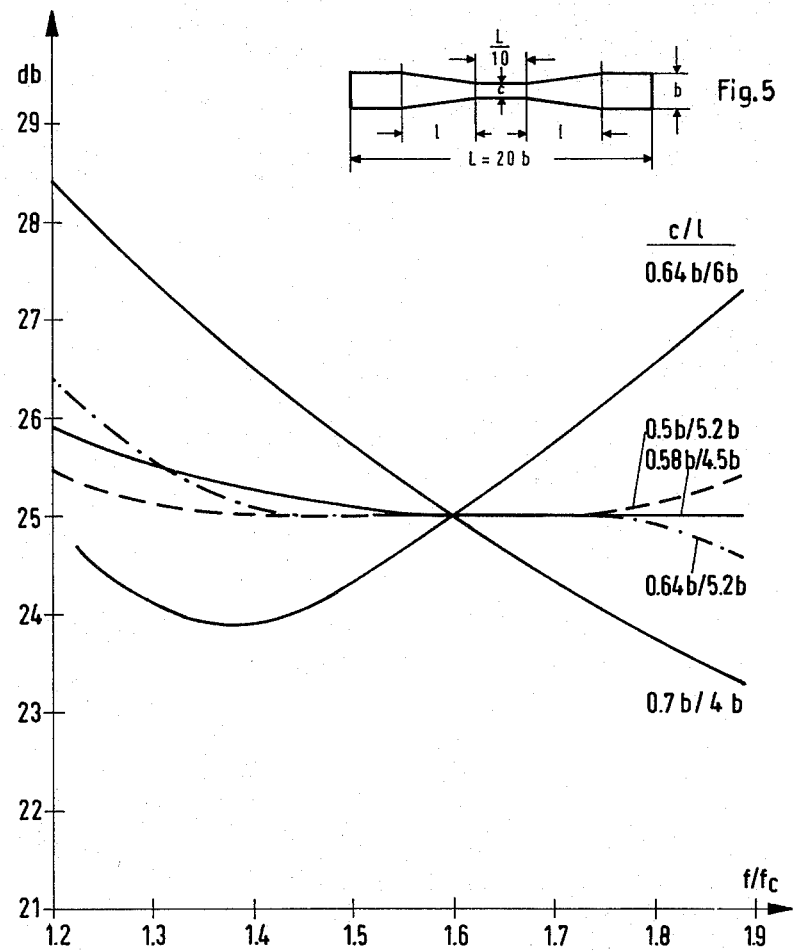
Fig. 9 Frequency response characteristics for various layer configurations at optimum resistivity.

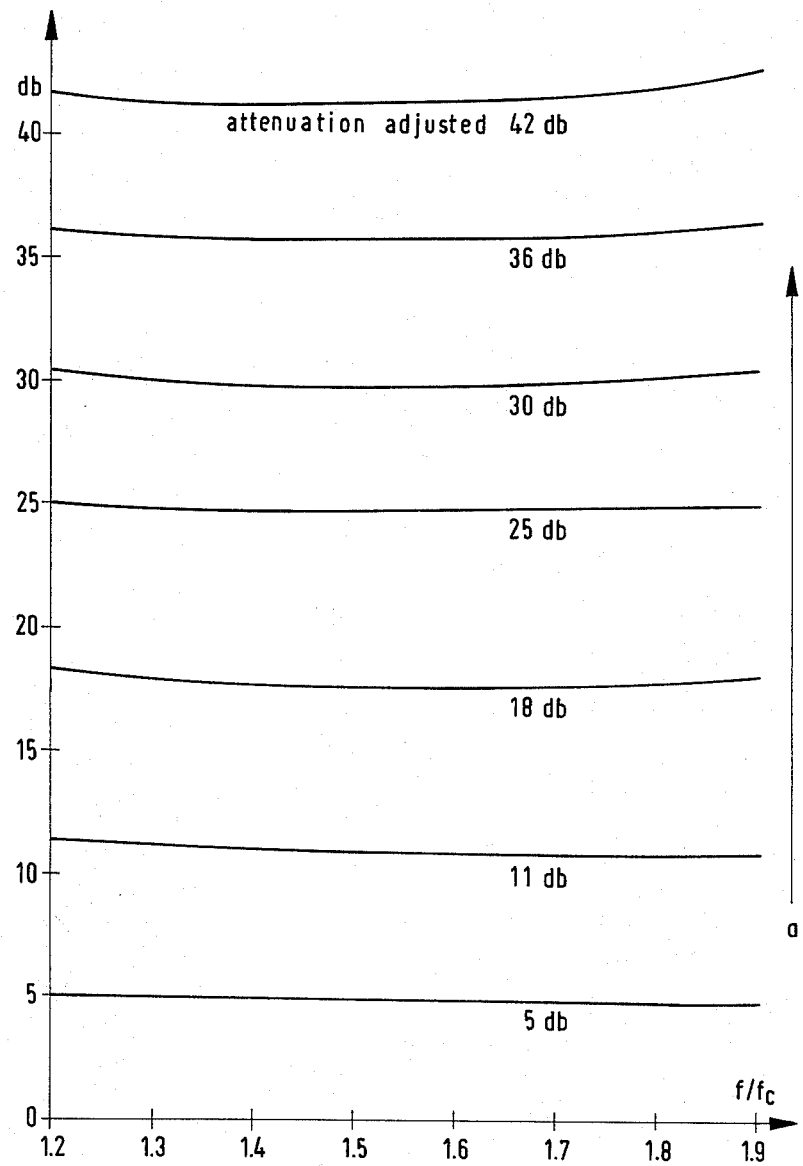
Fig. 6 Frequency response characteristics of a bent resistive layer in a waveguide for various immersion depths "a".

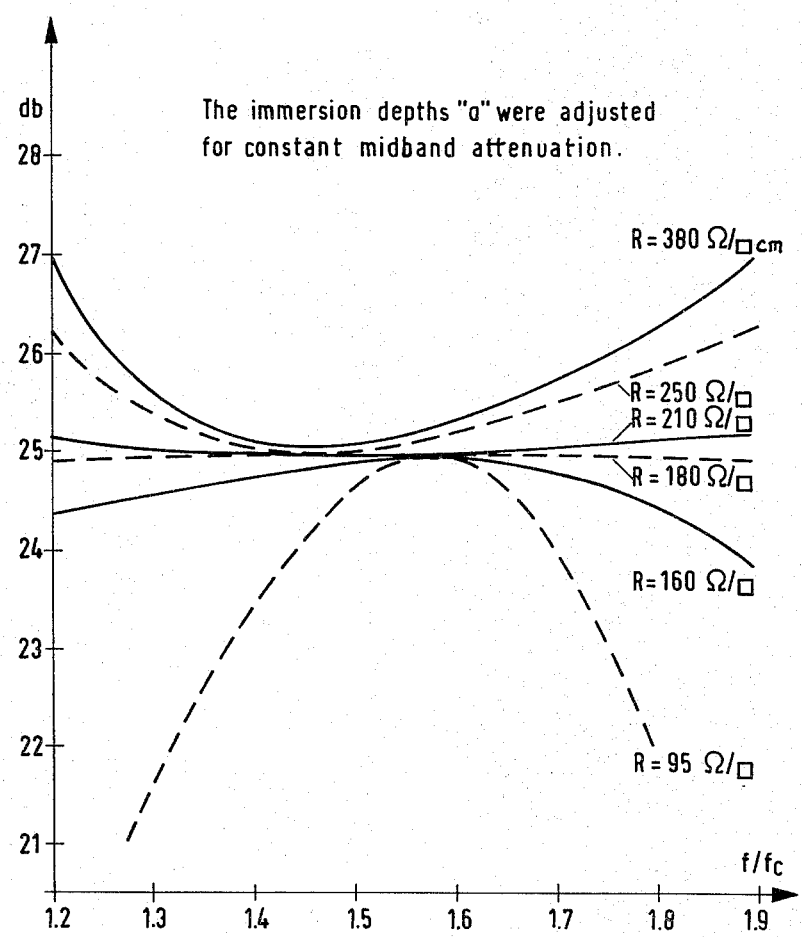
Fig. 7 Frequency response characteristics of layers with various resistivities and optimum configurations.

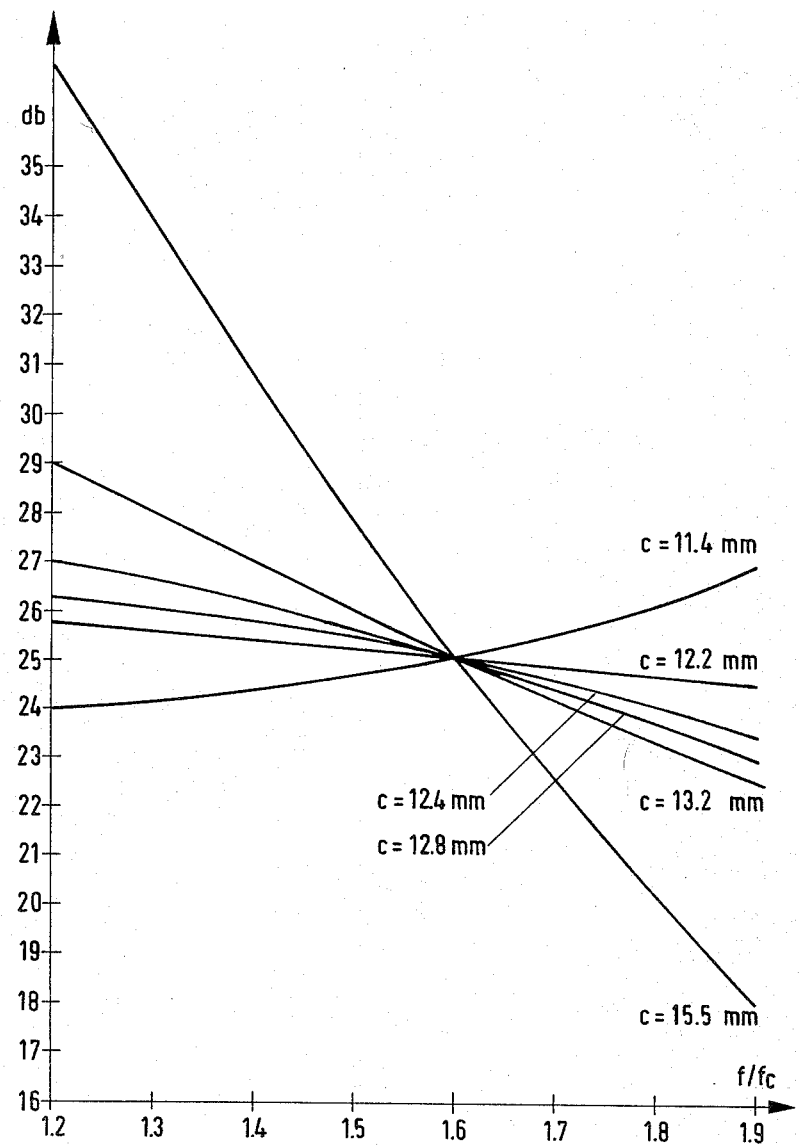
Fig. 8 Frequency responses for various layer widths "c" of optimum-resistivity layers.

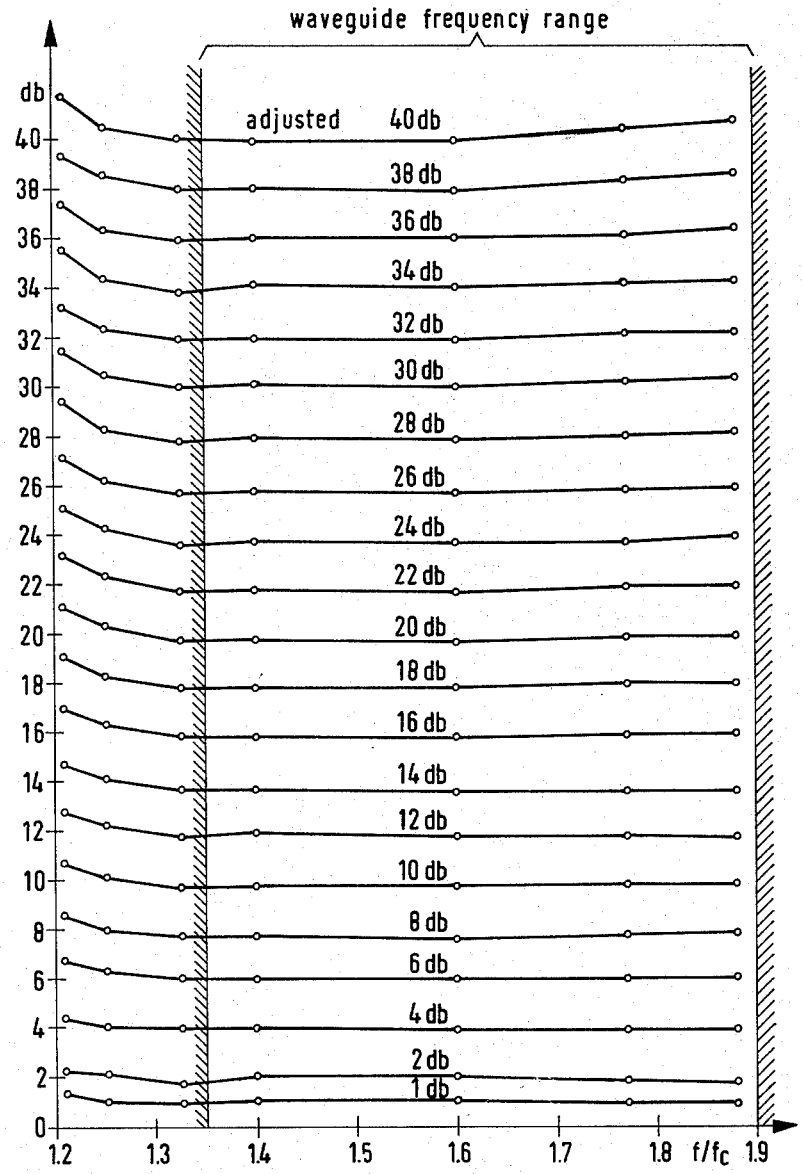
Fig. 10 Frequency response characteristics of an aligned energy absorber for various attenuation values adjusted.

United States Patent Office

3,175,172
Patented Mar. 23, 1965

3,175,172
LOW REFLECTION ENERGY ABSORBERS FOR
WAVEGUIDES
Christian Stäger, Konitz, near Bern, Switzerland, assignor to Wandel u. Goltermann, Reutlingen, Wurttemberg, Germany
Filed Aug. 8, 1962, Ser. No. 217,241
Claims priority, application Switzerland, July 26, 1960, 8,509/60
2 Claims. (Cl. 333—81)

The present invention relates to components of waveguides employed for transmission of energy at very high frequencies, and more particularly to low reflection energy absorbers necessary to attenuate the signal strength in the waveguide or to terminate the waveguide.

This application is a continuation-in-part application of my application Serial No. 126,221, filed July 24, 1961, now abandoned.

Such waveguide terminations and attenuators, summarized under the term energy absorbers, should meet certain specifications known to any person skilled in the art. They should have a uniform frequency response throughout and as wide frequency range as possible. Their reflection should be as low as possible. Moreover, such energy absorbers should be of simple design and capable of being conveniently manufactured. The overall length of an energy absorber should be small for convenient mounting. When the energy absorber is variable, simple adjustment and convenient reading of the value adjusted are desirable.

Existing embodiments of such waveguide components cannot meet all of the above requirements at the same time. The most conspicuous disadvantage of conventional components is the high voltage reflection coefficient causing 5 to 20 percent of the energy to be transmitted, to be reflected back to the energy source. Terminations of low reflection over large frequency bandwiths are not available. Many attenuators have no attenuations independent of the frequencies. The variable types of conventional attenuators require either calibration curves or special, nonlinear scales for readings of the attenuation adjusted. Some of the existing waveguide components for the attenuation of signal energy and for termination of the waveguide are variable and independent of the frequencies, but they have high reflection coefficients and large dimensions; in some cases they are dependent on different waveguide cross-section within the units. The variation of the attenuation is usually brought about by rotating or shifting the component within the waveguide.

While the present invention is not concerned with the material of which the attenuating element is made and which is conventionally manufactured as a resistive layer or as a dielectric of lossy characteristic, its primary objective is to provide arrangements of energy absorbers capable of eliminating the disadvantages indicated at the same time.

It is therefore an object of the invention to provide, for waveguides, energy absorbers of such a shape and such location inside the waveguide that the requirements of low reflection, large bandwidth and flat frequency response of the attenuation are fulfilled at the same time.

Another object of this invention is to eliminate the need of using different cross-sections in a waveguide line for the purposes of attenuation or termination.

A further object of this invention is to provide a simple shape of the carrier of the absorbing resistive layer and so to simplify manipulation and to reduce the cost of manufacture.

The feature believed to be characteristic of this invention is the use of one or more resistive layers of uniform resistivity extending from the inner waveguide wall or walls in a curved configuration towards the centerline of the waveguide in such an arrangement that the attenuation is controlled primarily by the shape and positioning of the absorbing layer of uniform resistivity while the frequency response is controlled by the width and form of such layer. The simplicity of this type of arrangement will become apparent in the more detailed description to follow and in connection with the attached drawings, wherein FIG. 1 is an arrangement for the termination of a waveguide;

FIG. 5 illustrates a front view of a resistive layer usable in a waveguide as shown in FIGS. 2, 3 and 4A, B; and FIGS. 6 to 10 are graphs in which attenuation is plotted against frequency for several data and configuration of a resistive layer as shown in FIG. 5.

These drawings represent the preferred embodiments of the present invention. It will be understood that various modifications may be made therein, and it is intended to cover, in the appended claims, all such modifications as fall within the true spirit and scope of the invention.

Figure 1:
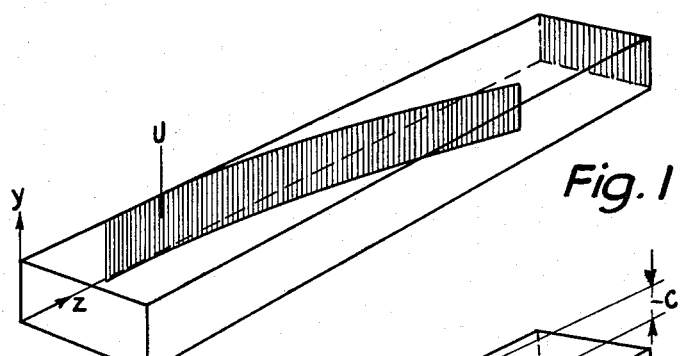

In FIG. 1, a resistive layer U extends from the inner wall of a waveguide, the dimensions of which extend in the directions $x$, $y$, and $z$, in a curved path towards the inner space of the waveguide. The electromagnetic field is propagated in $z$ direction. Both the curvature and the position of the resistive layer in the waveguide contribute to a drastic reduction of the reflection by this type of energy absorber. Visible at the far end of the waveguide is a metallic short circuit, shaded in the same way as the energy absorber, the purpose of which is described in the last paragraph of this specification.

Figure 2:
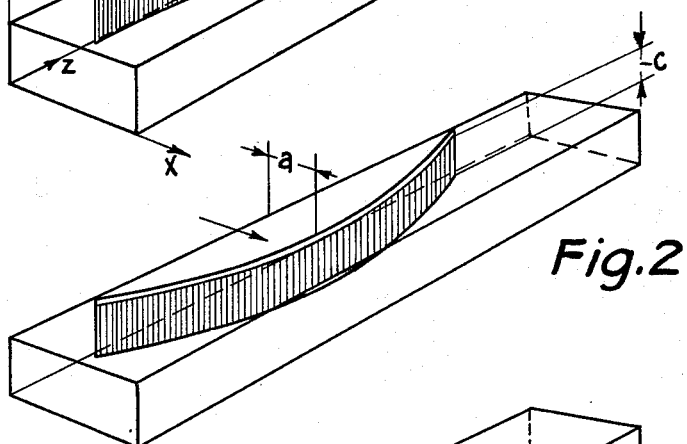
FIG. 2 is an arrangement for attenuation in a wave guide employing one single resistive layer.

FIG. 2 is an energy absorber consisting of one single resistive layer. In addition to the properties of this layer described in connection with FIG. 1, the uniform frequency response of this resistive layer is determined by the width $c$ and configuration of the layer, the specific layer resistively determines the curvature of the frequency resopnse. This resistivity is uniform and the same for each unit area of the layer and for all layers of all embodiment for absorbers here described.

Figure 3:
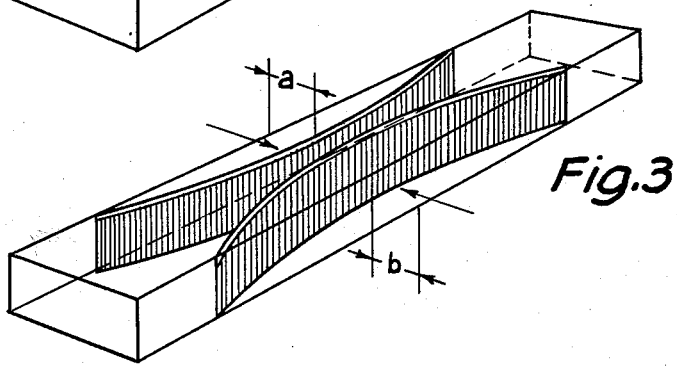
FIG. 3 shows an attenuator as in FIG. 2 using two resistive layers.

FIG. 3 is essentially the same arrangement as in FIG. 2, the difference being the use of two resistive layers in this energy absorber instead of only one with $a$ and $a'$ denoting the two respective immersion depths. The number of layers employed depends on the desired power rating of the attenuator.

The arrangements described are made variable by providing pliable carriers of the resistive layers and displacing them in the directions indicated by arrows in FIGS. 2 and 3. It is typical and within the scope of this invention that at least one end of the resistive layer or layers remains in close mechanical contact with the waveguide wall or walls at all times. It is likewise characteristic that the resistive layers in FIG. 3 have similar widths, but they are curved along their length to achieve a flat frequency response of the attenuation characteristic. The relation between a knob turning and the logarithmic attenuation constant becomes linear, because of using a drive mechanism with a suitable cam for the displacement of the one to two resistive strips. Thus it is possible to have the attenuation readings appeared on an indicating intrument such as a linear scale or a counter.

Figure 4A:
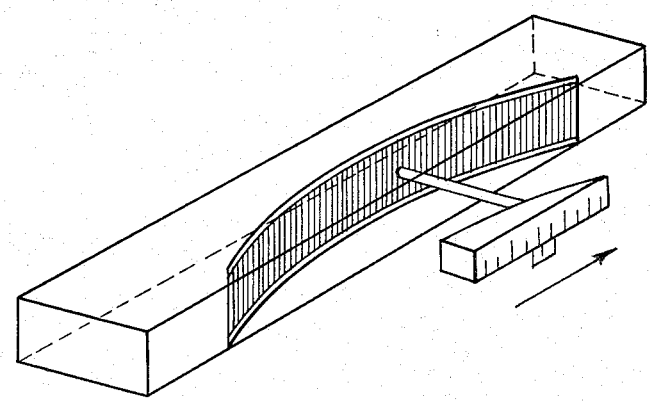
FIGS. 4A and 4B show two embodiments of variable energy absorbers.
Figure 4B:
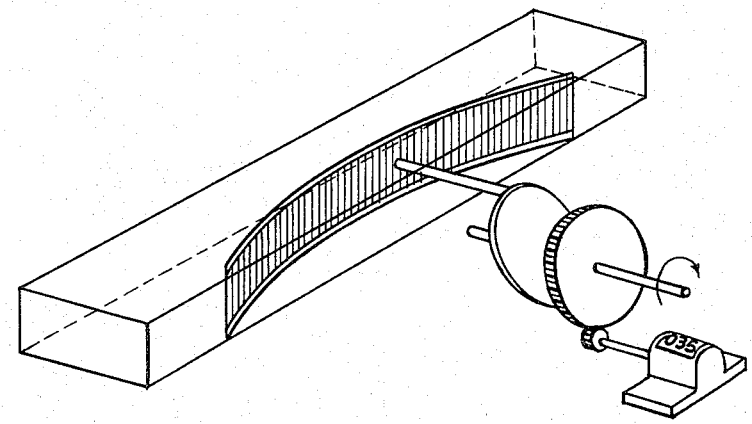

FIG. 4 shows two embodiments of drives with cams for the immersion of resistive layers into the waveguide space and permitting to obtain attenuation readings either from a linear scale ($a$ in FIG. 4) or from a counter ($b$).

The embodiments described in connection with FIGS. 1 to 4 offer two essential advantages. Firstly, the special configuration of the resistive layer, that is, the bending radius of the layer and the variation of the layer width, results in an attenuation response, which is frequency independent for a bigger range of immersion depth variation ($a$ in FIG. 3); secondly, the effect of the resistive layer upon the field increases in increments so small that the reflection obtained remains very low.

In the true sense of the invention, the frequency response of the arrangement can be improved by varying, along the longitudinal extension of the energy absorber, the width of the resistive layer indicated by $c$ in FIG. 5. With a layer of this configuration, the frequency-response characteristic will remain flat to within ±2 percent of the attenuation adjusted; this value may be regarded as the limit of accuracy achievable by precision attenuators. A number of actual measurements showing this accuracy has been compiled in FIG. 6. The surface resistivity of the resistive layer was 210Ω/square; the width $c$ of the layer was 0.3 the value of the inner width of the waveguide of FIG. 4 in $x$-direction as defined in FIG. 1.

The following details may illustrate the effects of choosing the proper configuration of the homogeneous resistive layer and its resistivity:

The effect of the surface resistivity upon the frequency response might become apparent from FIG. 7. Here the frequency-response characteristics are plotted of resistive layers having similar lengths, but different surface resistivities, and obtained from the $H_{10}$ mode of propagation in the rectangular cross section waveguide. For convenient evaluation, the layer widths were so chosen as to have about the same attenuation at the two corner frequencies of the band. The depth of immersion ($a$ in FIG. 2) was adjusted to the same midband attenuation in the case of each energy absorber employed in this experiment. FIG. 7 indicates that the optimum surface resistivity is 200 ohms per square because it results in a flat frequency-response characteristic.

The effect of the layer configuration, especially the layer width upon the frequency response, can be influenced by two methods described in the two paragraphs to follow, both being combined with the optimum resistivity described in connection with FIG. 7 above.

One method consists in reducing the layer width ($c \leq b$, $l=0$) along the entire length L of the layer, by any suitable machining process and measuring the frequency response associated with each width. The results are plotted in FIG. 8 indicating the frequency response characteristics so obtained for each layer width. FIG. 8 gives the most favorable layer width. The maximum depths of immersion $a$ were so chosen that the midband attenuation was the same for all widths $c$ used. This layer configuration is useful to provide predetermined and constant attenuation independent of the frequency; however, it will not result in flat frequency-response characteristics for all immersion depths feasible.

The other method of altering the frequency response by way of modifying the layer configuration is to vary the layer width $c$ by increments along the longitudinal axis of the layer as indicated in FIG. 9, a family of frequency-response characteristics obtained from different ratios of the layer dimensions shown. In FIG. 9 each curve has a pair of parameters, $c$ and $l$ as defined in FIG. 5, whereby dimensions are given in values of maximum layer width $b$. As one can see from FIG. 9, there are flat response curves for different $c$ and $l$ pairs within the tolerance of ±2% of the $db$ values. Inaccuracies of the resistivity and of the layer configuration may affect the magnitude of the attenuation adjusted, but they have an insignificant effect upon the flatness of frequency response. It was found, that at optimum resistivity of 200Ω/square, ±10% are permissible.

FIG. 10 indicates the frequency response characteristics associated with the attenuation adjustments of an energy absorber constructed on the basis of the principles described, with $c$ and $l$ selected from within the range derivable from FIG. 9 as desirable values.

Having thus fully disclosed my invention, what I claim is:

1. Low reflection energy absorber for waveguide comprising, at least one symmetrically bent, curved resistive layer, having uniform specific layer-resistivity and extending from the waveguide inner wall in a curved configuration toward the waveguide center line and of such a length that the specific layer resistivity configuration and width of each individual resistive layer renders the energy absorber and attenuation for normal band width independent of the frequencies, said resistive layer in the region of the midpoint of its length being narrower than the said layer in the region of its ends, said ends being substantially the same width as the inner width of the waveguide while the said region of the midpoint of the layer having a width of about 3/10 that of the inner width of the waveguide.

2. Low reflection energy absorber as claimed in claim 1 in which there is provided a mechanical variation of the curved resistive layers so that the depth of immersion of each of the said layers into the space enclosed by the waveguide and the logarithmic attenuation constant thus varied is exactly linearized by a cam-drive system resulting in readings of the attenuation adjusted on a linear indicating instrument.

References Cited by the Examiner
UNITED STATES PATENTS

| | | | |
|---|---|---|---|
| 2,474,688 | 6/49 | Pease | 333—81 |
| 2,491,662 | 12/49 | Houghton | 333—81 |
| 2,602,857 | 7/52 | Hewitt | 333—81 |
| 2,646,551 | 7/53 | Roberts | 333—81 |
| 2,656,518 | 10/53 | Good | 333—81 |
| 2,705,780 | 4/55 | Weber | 333—81 |

HERMAN KARL SAALBACH, *Primary Examiner.*

ELI LIEBERMAN, *Examiner.*